O. W. RANDOLPH.
GRAIN AND SEED DRIER.
APPLICATION FILED DEC. 18, 1916.
1,276,812.
Patented Aug. 27, 1918.
5 SHEETS—SHEET 4.
Fig. 10.    Fig. 11.    Fig. 15.    Fig. 16.
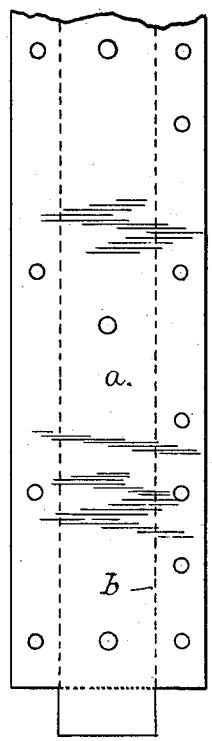
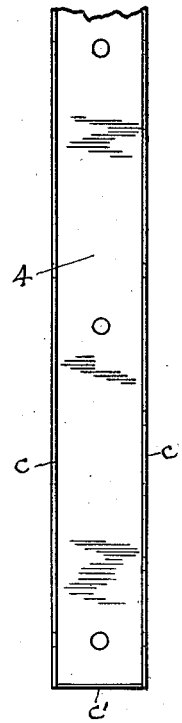
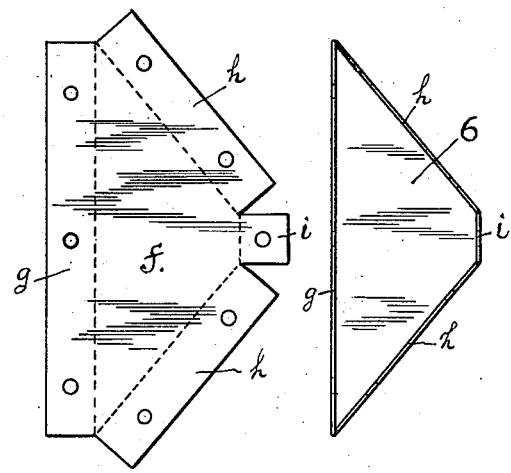
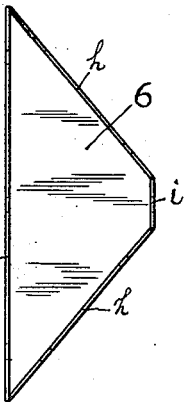
Fig. 17.
Fig. 12.    Fig. 13.
Fig. 18.    Fig. 19.
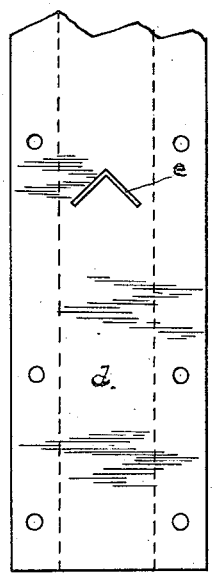
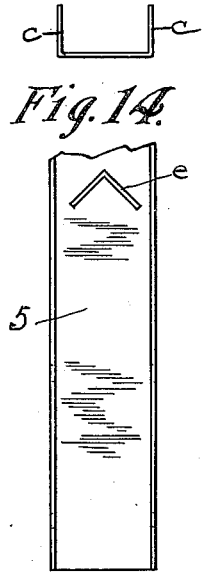
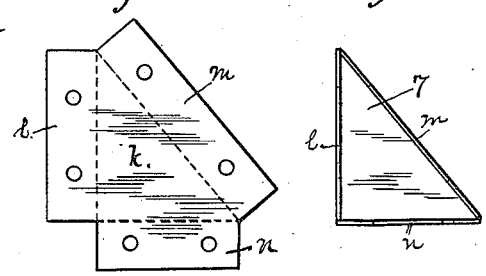
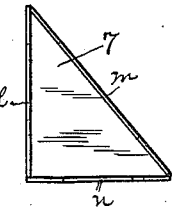
Fig. 14.
Fig. 20.
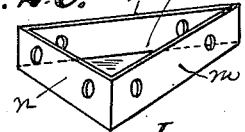
Inventor
Oliver W. Randolph
by Robt. B. Wilson
Attorney O. W. RANDOLPH.
GRAIN AND SEED DRIER.
APPLICATION FILED DEC. 18, 1916.
1,276,812.
Patented Aug. 27, 1918.
Fig. 21.
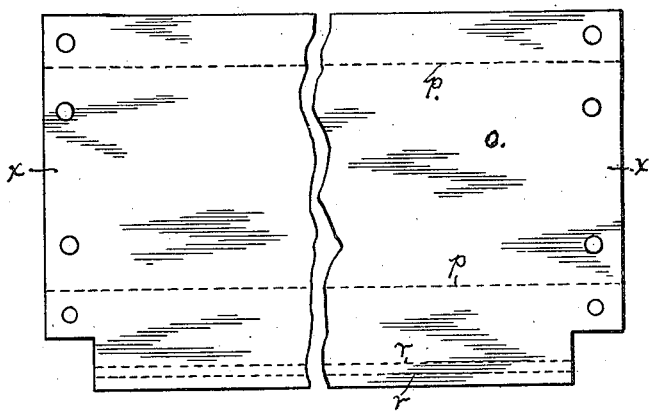
Fig. 23.
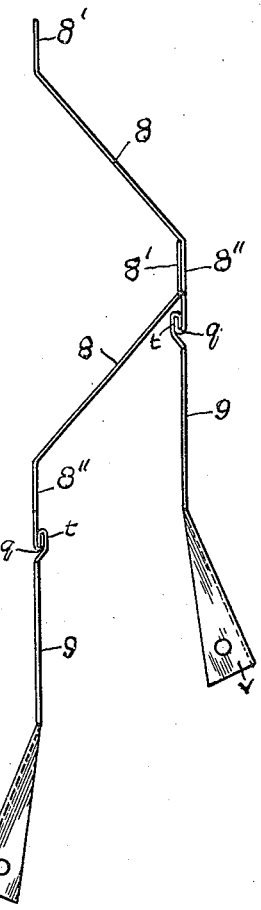
Fig. 22.
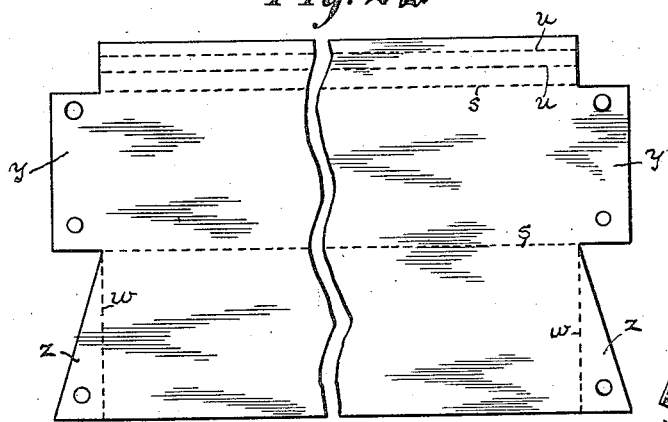
Fig. 24.
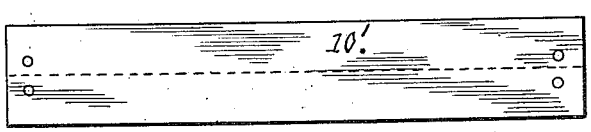
Fig. 25.
Fig. 26.
Fig. 27.
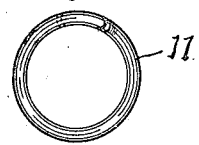
Inventor
Oliver W. Randolph
by Robt. B. Wilson
Attorney

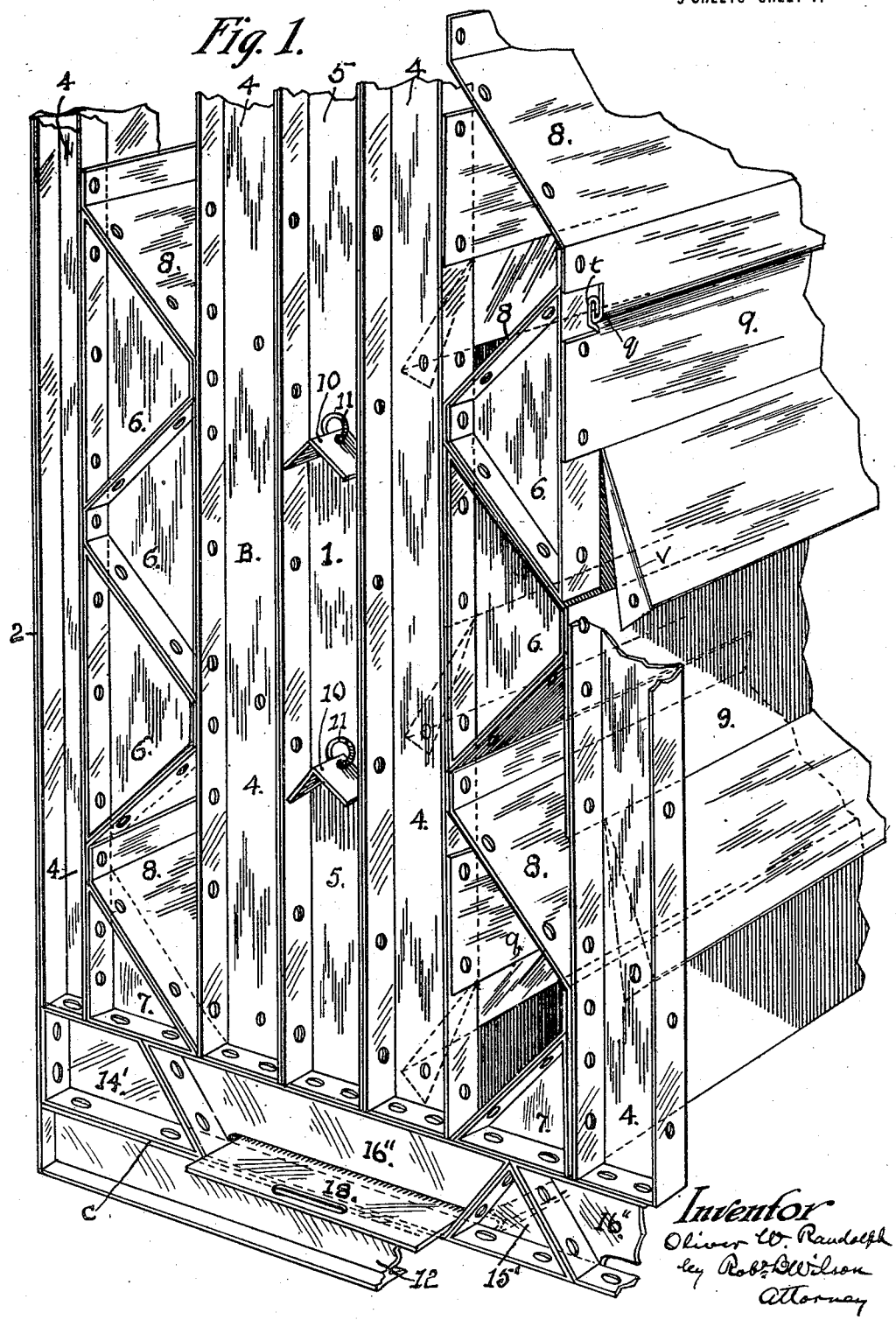

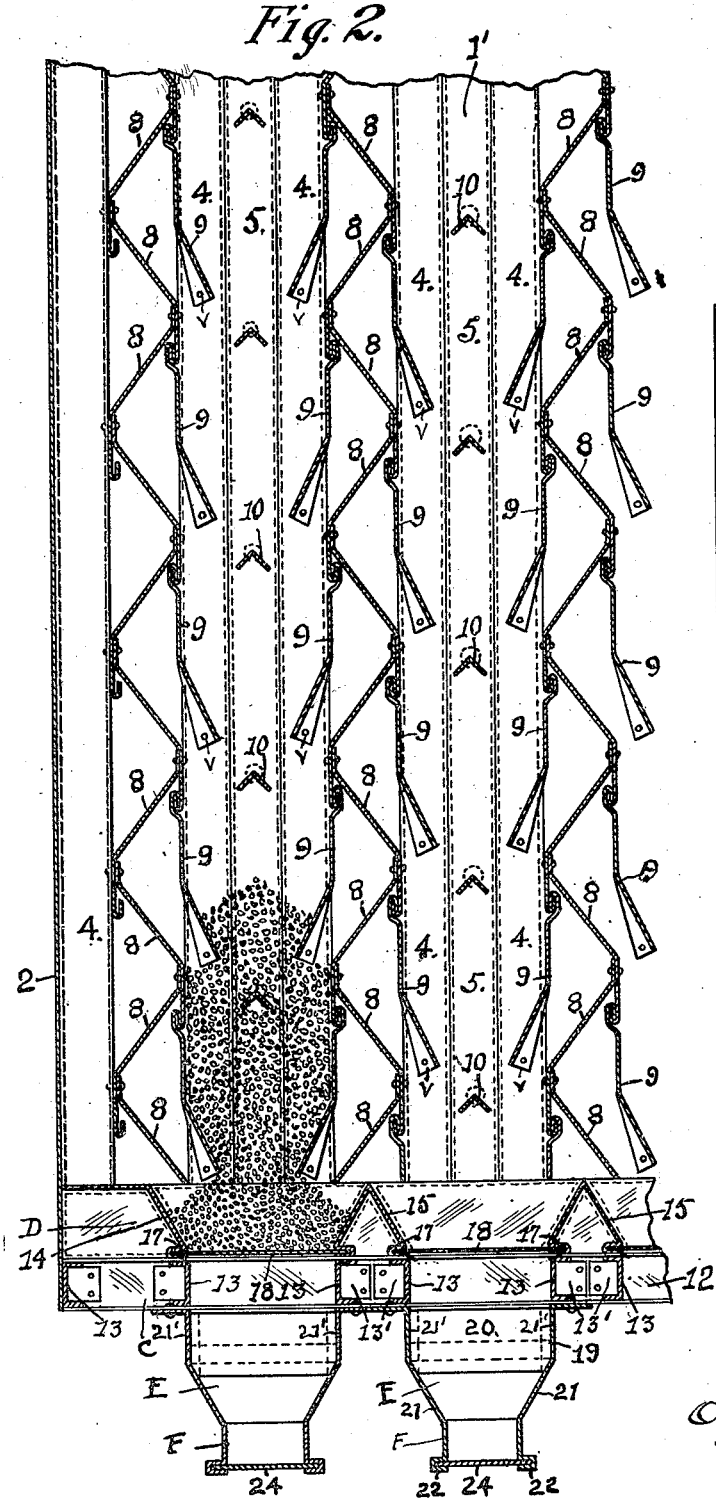
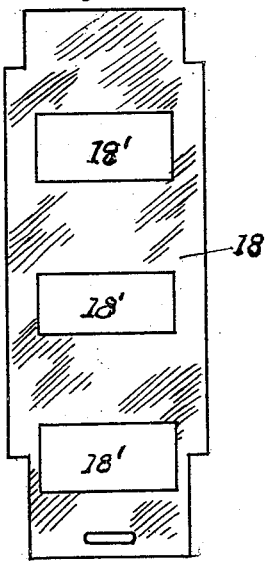
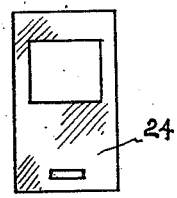

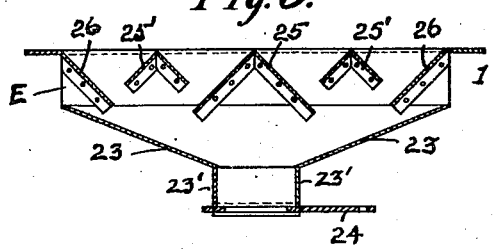
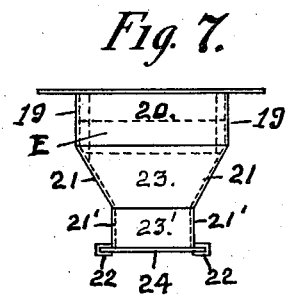
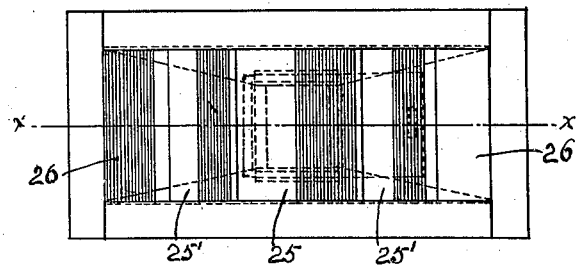
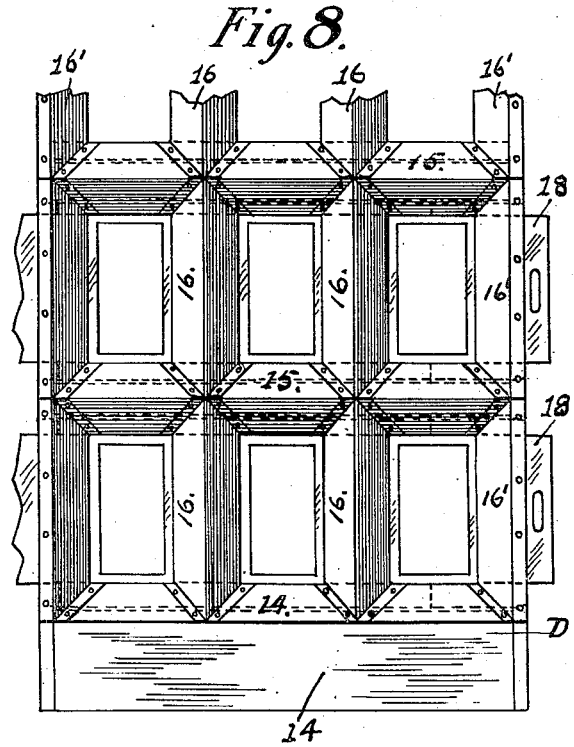
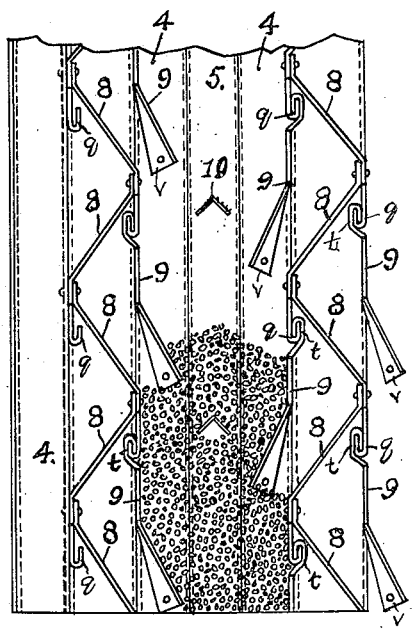

UNITED STATES PATENT OFFICE.

OLIVER W. RANDOLPH, OF TOLEDO, OHIO.

GRAIN AND SEED DRIER.

1,276,812.  Specification of Letters Patent.  Patented Aug. 27, 1918.

Application filed December 18, 1916. Serial No. 137,529.

*To all whom it may concern:*

Be it known that I, OLIVER W. RANDOLPH, a citizen of the United States, residing at Toledo, in the county of Lucas and State of Ohio, have invented new and useful Improvements in Grain and Seed Driers, of which the following is a specification.

My invention relates to a grain and seed drier.

In Letters Patent No. 1,196,979 dated September 1, 1916, I have shown and described a grain drier built up of certain standard units of construction, adapted when combined, to form the body of the drier of any desired number of grain chutes, wherein the sides of the chute are formed of a series of converging foraminous plates opposite the inner angles of zigzag partitions common to each two adjacent chutes, and forming with the foraminous plates air inlet and outlet ducts whereby air forced into the inlet ducts passes through the grain in the chutes and out of the outlet ducts, the converging foraminous plates forming the sides of the chutes operating to distribute the weight of the grain in the chutes largely to the sides of the chutes at short intervals of their heights whereby uniform density of the grain and freedom of air circulation therein and therethrough is secured.

In said patent I have also shown and described means of regulating and controlling the flow of grain through the chutes, whereby the percentage of moisture extracted from the grain in its passage through the chutes is regulated and controlled and made uniform in all the chutes.

Without departing from the principle of construction and operation of the said patented drier, the object of my present invention is to provide a drier that is adapted to be used for drying all kinds of grain and seeds, and wherein the units of construction are simplified in form, whereby the cost of construction is reduced, and wherein improved means of controlling and regulating the rate of flow of the grain through the chutes are provided.

I accomplish these objects by the construction, arrangement and combination of parts as hereinafter described and illustrated in the drawings, in which—

Figure 1 is a broken away perspective view of the body of the drier.

Fig. 2 is a vertical section of the drier body parallel with the air inlet and outlet sides, (the upper portion of which is broken away for lack of room) and also of the garner and of the valve controlled discharge spouts of each grain chute.

Fig. 3 is a plan view of the regulating valve of a grain chute.

Fig. 4 is a similar view of the discharge valve of the discharge spout of each chute.

Fig. 5 is a cross section of Fig. 6 on line $x$—$x$.

Fig. 6 is a top plan view of the garner of a discharge spout.

Fig. 7 is an end view of the same.

Fig. 8 is an enlarged top view of a broken away portion of the garner of the grain chutes.

Fig. 9 shows a modified form of assemblage of the units, to form a modified form of grain chute.

Fig. 10 shows form of blank for the outer channel bar units of a grain chute.

Fig. 11 is a plan view of the channel bar formed of the blank shown in Fig. 10.

Fig. 12 shows form of blank for forming the middle channel bar of each chute.

Fig. 13 is a cross section of both the middle and outer channel bars.

Fig. 14 is a plan view of the channel bar formed of the blank shown in Fig. 12.

Fig. 15 shows form of blank for forming a unit.

Fig. 16 shows unit formed of the same.

Fig. 17 shows a perspective view of the unit shown in Fig. 16.

Fig. 18 shows a blank for forming a unit.

Fig. 19 shows a plan view of the unit formed therefrom.

Fig. 20 shows a perspective view of the same.

Fig. 21 shows a blank for forming a reversible plate for forming air ducts.

Fig. 22 shows a blank for forming a reversible plate for forming the division deflector plates thereof between the grain chutes and the air ducts.

Fig. 23 shows an edge view of the air duct and division units as connected in reverse to form a partition between two grain chutes.

Fig. 24 shows a blank for forming a unit.

Fig. 25 is a perspective view of the unit formed of the blank shown in Fig. 24 reduced in size and provided with fasteners.

Fig. 26 shows an enlarged edge view of a fastener for the same, and

Fig. 27 is a side view of the same.

In the drawings B designates the elongated rectangular hollow body of a drier constructed in accordance with my invention, and comprises the air inlet side 1, the outlet side 1' opposite the inlet side 1 and the opposite sides 2 formed of plain sheet metal.

The sides 1 and 1' are each formed of the units 4, 5, 6 and 7 combined and secured together by bolts respectively, as hereinafter described.

The units 4 are sheet metal channel bars of suitable lengths equal to the height of the drier body B, and are formed of sheet metal blanks $a$ of suitable length and width bent in a die along the dotted lines $b$ of Fig. 10 to form the flange sides $c$ and end $c'$ of the channel. Instead of the units 4 being in lengths of the height of the body B they may be in shorter lengths, adapted to make up a plurality of units 4 sufficient in number to make up the desired height of the body B.

The unit 5 shown in Fig. 14 is of similar construction to unit 4 and may be of equal or greater width, but the blank $d$ of which it is formed is provided at regular intervals with the angular incuts $e$ as shown in Fig. 12, for a purpose hereinafter described.

The unit 6 is also formed of a sheet metal blank $f$ of the form shown in Fig. 15 having the perforated side extensions $g$, $h$ and $i$, which when the blank is struck up in a suitable die are formed into the sides $g$, $h$ and $i$ respectively of the unit 6 as shown in plan and perspective respectively in Figs. 16 and 17.

The unit 7 is also formed of a sheet metal blank $k$ of the form shown in Fig. 18 having the perforated side projections $l$, $m$ and $n$ which when the blank is struck up in a suitable die forms the triangular unit 7 having the projections $l$, $m$ and $n$ respectively forming the flange sides of the unit.

The units 4 and 5 are assembled for forming the sides of each chute with the units 4 bolted by their side flanges to the side flanges of units 5 and each chute is formed by units 8 cross connecting the outer flanges of the units 4 of sides of each chute thus formed, as hereinafter described, the units 8 forming common partition walls between adjacent chutes, and the units 9 forming with the units 8 air inlet and outlet ducts of the chutes.

The units 8 are each formed of a blank $o$ by being struck up in a suitable die to angle the blank along the dotted lines $p$ to form the parallel marginal portions 8' and 8'' with the main body portion diagonal between and form the marginal hook $q$ by bending the blank along the dotted lines $r$ as shown in end view in Fig. 23.

The units 9 are each formed of a sheet metal blank of the form shown in Fig. 22 struck up in a suitable die to angle the blank along the parallel dotted lines $s$, to bend the blank along the dotted lines $u$, and form the ears $v$ by backward bends along the dotted lines $w$.

The end marginal portions $x$ of the unit 8 and the end marginal portions $y$ and $z$ of the unit 9 are perforated as shown in Figs. 21 and 23 respectively, to register respectively with perforations of the flanges and body portions of the units 4 respectively, and with the units 6 and 7 when used to fill spaces.

The units 8 are secured cross connecting the outer flanges of the units 4 of adjacent chutes by bolts through the end portions of the marginal portions 8' and 8'' and the flanges of the units 4, the units 8 being alternately reversed in position, and the marginal portions 8' of one unit overlapping the marginal portion 8'' of the next higher unit 8 as shown in Fig. 2.

The units 9 are secured at their upper portions to the lower portion of the next higher unit 8 by engaging the hook $t$ of the unit 9 with the hook $q$ of the unit 8 and then bolting the ears $v$ to the innner body portion of the unit 4.

The unit 10 is formed of an elongated rectangular sheet metal blank 10' by bending the blank at a suitable angle along the center line of its width, adapting the unit to be extended through opposite incuts $e$ of the units 5 of each chute.

The end portions of each unit 10 are perforated to receive an open ring 11 at each end, which adapts said units to be individually removed and replaced by removal of one of the rings, and when both rings are in place prevent accidental detachment of either end.

The sides 2 of the drier body are formed of sheet metal plates, preferably reinforced at the corners by units 4 bolted by their outer flanges to perforated margins of the sides, the units 8 of the next adjacent chute being bolted to the inner flanges of the units 4 of the sides 2.

The drier body B is completed by filling all the triangular spaces of both sides 1 and 1' having their bases abutting the units 4 of the sides 2 with units 6, all of the half spaces at the lower and upper ends of the sides 1 and 1' with the units 7, and leaving all the lowermost full spaces of the chutes of the inlet side 1 open, and closing them with units 6 on the outlet sides, and by closing the alternate spaces of each chute on the inlet side and leaving open the corresponding spaces of the outlet side 1'.

The drier body B thus constructed is mounted on a base C comprising a grid formed of the front and rear I beams 12 and cross channels 13, as shown in section in Fig. 2, and the garner D mounted on the grid and formed of the side units 14, the intermediate units 15 and the cross units 16 and 16', the grid and the garner being built up of said units respectively according to the number of chutes in the drier body B.

The cross channels 13 of the grid are of dimensions to enter endwise between the frames of the I beams 12 and are secured thereto by angled end portions 13' in pairs below and in line with the outer flange of the units 4 of each chute, as shown in Fig. 2, and above each pair of channels 13 are located the intermediate units 15 of the garner, said units 15 being formed of a sheet metal strip of suitable length bent triangular in cross section, with the base sides 17 doubled back to form slide ways for the slide valves 18.

The side units 14 are also formed of sheet metal bent rectangular as to three sides and having the inner side inclined at an angle equal to the inclination of the sides of the unit 15 and having a portion of its base doubled back to form a companion slide way to the opposite slide way of the next adjacent unit 15.

The cross units 16 of the garner are formed of sheet metal blanks of suitable shape, lengths and width, bent centrally of their width V shaped at suitable angle with flanges at their ends by which they are secured to the units 14 and 15, as shown in Fig. 8, and the units 16' are substantially halves of the units 16, secured along the front and rear sides in like manner.

The base C is completed by filling in the spaces between the units 15 and between the units 15 and the side units 14 respectively with the flanged closure units 16" and the open ends of the units 14 and 15 are respectively closed with the flanged closure units 14' and 15' respectively. All of said units being formed of suitable blanks of sheet metal in like manner as described for units 6 and 7, and the flanges of said units are perforated to register with perforations of the units 14 and 15, to which they are secured by bolts and to the eye beams 12 whereby the units of the base C are all secured together, and the body B is secured to the base C by bolts through the end flanges of the units 4 and 5 of the body.

To the under side of the I beams 12 of the base C are secured below and in line with each chute of the drier body B, a discharge hopper E comprising the rectangular sides 19, the ends 20, the inwardly inclined hopper sides 21 having the portions 21' bent vertical and parallel and bent at their lower margins to form the valve slide ways 22, and the inwardly inclined hopper ends 23 having lower portions 23' bent vertical and suitably joined to the portions 21' of the sides 21 to form the rectangular discharge spout F, having the regulating valve plate 24 suitably mounted on the slide ways 22.

Cross connecting the sides 19 of the hopper E are the angle garner plates 25 and 25', and the opposite inclined end garner plates 26. The central garner 25 is disposed vertically above the discharge spout F, and the free edges of said garner extend over the inclined ends 23 of the hopper E whereby direct access of grain to the spout F is cut off. The equal garner plates 26 cross connect the sides 19 and are disposed inwardly at equal angles to the ends 20 of the rectangular portion of the hopper E, the inclination of the plates being also equal to the angle of inclination of the sides of the central garner 25. The garners 25' are disposed between the garners 25 and 26, and are of dimensions to prevent direct access of grain to the spaces between the garners 25 and 26, and so disposed, the garners are adapted to prevent unequal flow of the grain through the valves 18 of the main garner D from all portions of the width of each chute.

The valve plates 18 have openings 18' adapted to be registered with corresponding openings of the garner D when pushed in, as shown in Fig. 8, and to be gradually closed as the valves are pulled out, whereby in conjunction with the valve plates 24 the speed of flow of grain through each chute, and from every part of each chute is equalized and controlled by the relative adjustment of the valves 18 and 24.

It is to be understood that the top end of the body B is provided with any suitable garner hopper by which the grain is uniformly delivered into the upper end of the several chutes of the body.

It is to be further understood that the entire inlet side 1 of the body is suitably connected to a blower and a heater in such manner that heated air is forced under pressure into each and every one of the open inlet ducts of the side 1, and from each inlet duct through the grain to the outlet duct next above each inlet duct, through the openings between the inwardly inclined lower portion of each unit 9 and the opposite unit 8.

Thus constructed and connected, it is manifest that by reason of the restricted passages of the grain between each opposite pair of units 9 and the central position of the unit 10 just below each such passage, that the weight of the grain is largely sustained by the units 9 and 10, whereby the column of grain in the chutes is of practically the same density throughout the height of the grain column, and that the joint effect of the units 9 and 10 is to force the grain that is next the units 9 toward the center of the column, and the grain that is central of the column toward the plates 9, whereby the grain is uniformly brought into contact with the units 9, which are heated by the heated air forced into and out of the ducts, and transmit the heat to the grain as it passes over them as well as from the passage of the heated air directly through the grain as described. By having the units 9 formed of plates without air openings therein the drier is made adapted to dry all kinds of grains and seeds without any part thereof entering the air ducts.

The speed of passage of the grain through the chutes is controlled and regulated by adjustment of the valves 18 and 24 and the uniformity of the passage of the grain column through the entire width of each chute is effected by the arrangement and construction of the base and discharge spout garners, which are adapted to correct the tendency of the central portion of the column to pass more freely than at the sides of the chutes.

In Fig. 9 is shown a modified form of arrangement of the units 8 and 9 whereby the units 9 and the air inlet and outlet ducts of each chute are staggered, without however, departing from the principle of construction hereinbefore described, and it is manifest that in either form of assemblage of the same units, I have produced an efficient drier adapted to dry all kinds of grain and seeds, without having to change the drier plates, as is necessary to be done with the foraminous plates of my said patented drier, to adapt them for the smaller kinds of grain and seeds.

What I claim to be new is—

1. In a grain and seed drier the combination of a drier body comprising a plurality of chutes for grain or seed formed of opposite vertical side channels, having perforated channel sides, cross connected by common zig zag partitions formed of alternately reversed plates, each having upper and lower marginal portions angled parallelly and said lower marginal portions having a marginal portion bent parallel with itself to form a hook, and perforated end marginal portions adapting the plates to be jointly and overlappingly secured to the perforated channel sides, and angled drier plates, one for each partition plate, said drier plates each having an upper marginal hook portion adapted to be hooked onto the hood portion of a partition plate with the upper portion extending vertically downward opposite the inner angles formed by two reversed partition plates, and with its lower portion inclined inwardly and downwardly of a chute, and provided with end ear portions adapted to be secured to the inner side of the channels.

2. In a grain and seed drier, the combination of a drier body comprising a plurality of chutes for grain or seed formed of opposite vertical side channels, having perforated channel sides, cross connected by common zig zag partitions, formed of alternately reversed plates each having upper and lower marginal portions angled parallelly and said lower marginal portions having a marginal portion bent parallel with itself to form a hook, and perforated end marginal portions adapting the plates to be jointly and overlappingly secured to the perforated channel sides, angled drier plates, one for each partition plate, said drier plates each having an upper marginal hook portion adapted to be hooked onto the hood portion of a partition plate with the upper portion extending vertically downward opposite the inner angles formed by two reversed partition plates, and with its lower portion inclined inwardly and downwardly of a chute, and provided with end ear portions adapted to be secured to the inner side of the channels, and angle plates transversely the chutes detachably extending at regular intervals centrally of each chute through opposite channels.

3. In a grain and seed drier, the combination with a drier body having a plurality of grain chutes, of a base for the drier body comprising a grid having openings, one below and in alinement with each chute, and a garner mounted on the grid base having hopper shaped openings above each chute opening of the grid adapted to limit and direct the flow of grain from each chute, a slide valve for each chute, adapted to regulate and control the garner openings for each chute, a discharge spout for each chute secured to the base below and in line with each chute respectively, and comprising a hopper and a spout, said hopper portion adapted to receive grain from each garner opening of a chute, and having garners adapted to prevent direct flow of grain from the chute valve to the spout, and a valve for the spout adapted to limit the flow of grain from the spout.

In testimony whereof I have hereunto set my hand at Toledo, Ohio, this 11th day of December, 1916.

OLIVER W. RANDOLPH.

In presence of—
 ALBERT T. GOORLEY,
 C. F. NIGHSWANDER.